United States Patent [19]
Cluff

[11] 4,296,731
[45] Oct. 27, 1981

[54] TRACKING BOOSTER AND MULTIPLE MIRROR CONCENTRATOR FLOATING COLLECTOR

[76] Inventor: C. Brent Cluff, 5525 N. Grande, Tucson, Ariz. 85704

[21] Appl. No.: 911,434

[22] Filed: Jun. 1, 1978

Related U.S. Application Data

[63] Continuation-in-part of Ser. No. 836,356, Sep. 26, 1977, Pat. No. 4,148,301.

[51] Int. Cl.³ .............................................. F24J 3/02
[52] U.S. Cl. .................................. 126/424; 126/438; 136/246
[58] Field of Search .............. 126/415, 424, 425, 438; 136/89 PC, 246

[56] References Cited

U.S. PATENT DOCUMENTS

| 1,946,184 | 2/1934 | Abbot . | |
|---|---|---|---|
| 3,321,012 | 5/1967 | Hervey . | |
| 3,866,285 | 2/1975 | Clark | 126/450 |
| 4,000,734 | 1/1977 | Matlock et al. . | |
| 4,098,264 | 7/1978 | Brokaw | 126/425 |
| 4,099,516 | 7/1978 | Caulier | 126/445 |
| 4,109,638 | 8/1978 | Matlock et al. | 126/425 |
| 4,114,596 | 9/1978 | Cheng et al. | 126/438 |
| 4,148,564 | 4/1979 | Devih et al. | 126/424 |
| 4,159,629 | 7/1979 | Korr et al. | 126/425 |
| 4,159,710 | 7/1979 | Prast | 126/425 |
| 4,169,712 | 10/1979 | Boyce et al. | 126/415 |

Primary Examiner—Carroll B. Dority, Jr.
Attorney, Agent, or Firm—Warren F. B. Lindsley

[57] ABSTRACT

A water-borne tracking solar energy collecting and converting system employing booster and multiple mirror concentrator collectors for concentrating sunlight on either photovoltaic cells and/or flat plate collectors.

15 Claims, 13 Drawing Figures

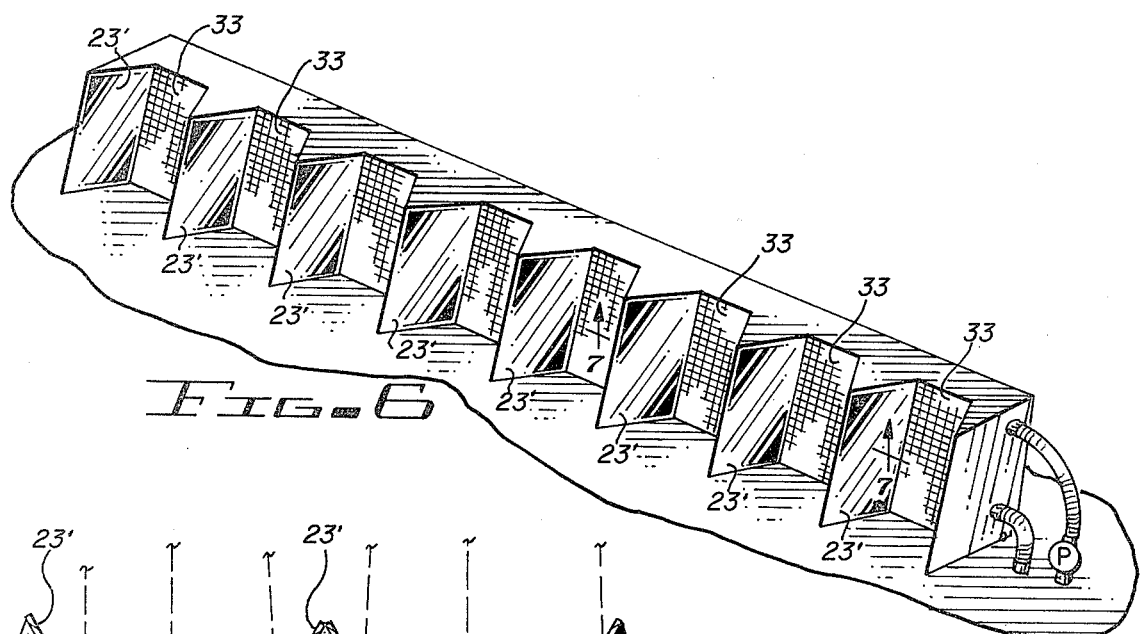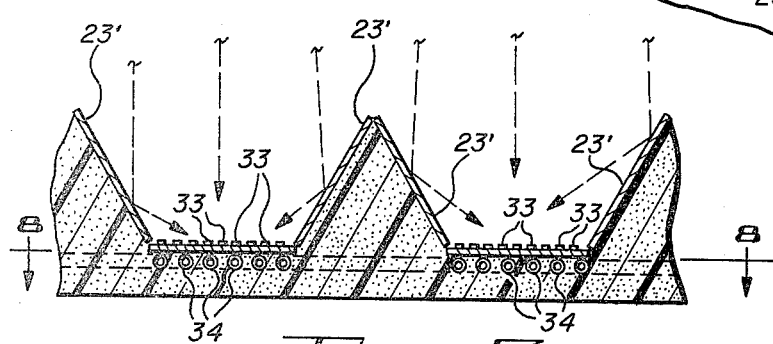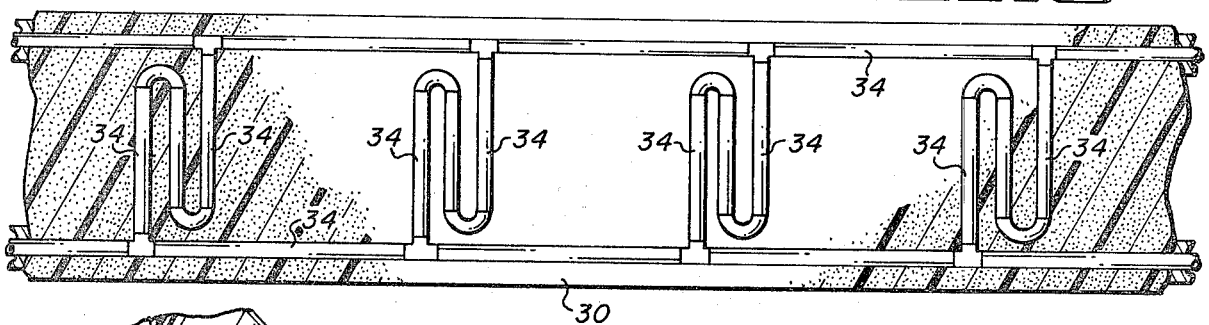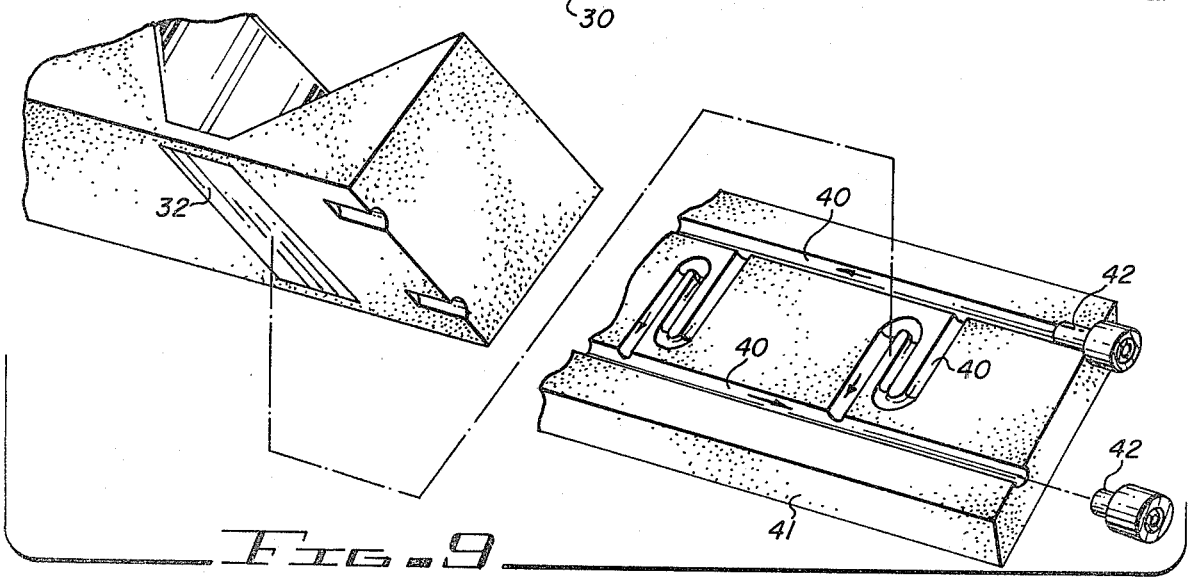

TRACKING BOOSTER AND MULTIPLE MIRROR CONCENTRATOR FLOATING COLLECTOR

BACKGROUND OF THE INVENTION

This application is a continuation-in-part of U.S. patent application, Ser. No. 836,356, filed Sept. 26, 1977, now U.S. Pat. No. 4,148,301, and entitled WATER-BORNE ROTATING SOLAR COLLECTING AND STORAGE SYSTEM.

DESCRIPTION OF THE PRIOR ART

Parabolic or cylindrical reflectors have been utilized in the past along with sun-tracking mechanisms in connection with various schemes for the collection, conversion and utilization of solar energy. U.S. Pat. No. 4,000,734 is descriptive of this type of equipment.

Heat exchangers or solar energy concentrators, particularly of the type adapted to collect cold or heat, have been constructed either with a series of tubes embedded in a flat black metallic surface or have comprised a curved or semi-cylindrical or parabolic reflector with a blackened tube mounted at approximately its focal point with U.S. Pat. Nos. 1,946,184 and 3,321,012 being representative thereof. Relative to this latter form of the prior art, fins or vanes have been mounted about the tube in an effort to obtain more efficiency from the unit. The back side of the tube is generally insulated to reduce energy losses.

At best, the prior art solar concentrating collectors have needed an elaborate system of gears and racks or other means to shift or otherwise change the positions of the exchange or collector unit used so that its relative position to the sun will remain constant.

While such prior art inventions do suggest a workable approach for tracking the sun, the particular implementations described in these patents have in general fallen short of what is required in a low cost and practical system.

SUMMARY OF THE INVENTION

In accordance with the invention claimed, an improved solar energy collecting and converting apparatus and system has been provided which is compact and inexpensive by virtue of its unique sun-tracking and solar collector mechanisms which significantly improve the efficiency of both conventional flat plate and concentrating collectors.

It is, therefore, one object of this invention to provide improved tracking mirror solar energy azimuth or dual tracking concentrating collectors mounted on a floating platform.

Another object of this invention is to provide a simplified way of azimuth tracking so that a continuous array of booster mirrors can be focused on alternate rows of either photovoltaic or flat plate collectors.

Another object of this invention is to provide a new and improved compact, low profile inexpensive floatable, dual tracking solar energy collecting system. This system periodically moves a bank of solar collectors mounted thereon in an arcuate path while orienting the sun's path to maintain the reflectors in a plane containing the sun's center, thus collecting the maximum energy possible.

Another object of this invention is to provide a method using the unique low profile multipe mirror approach by the use of wider collectors of higher energy than has heretofore been feasible.

A further object of this invention is to provide an inexpensive solar energy collector which achieves maximum energy collection throughout every day of the year by virtue of its effective yet inexpensive solar tracking mechanism and converter moving mechanism.

A still further object of this invention is to provide improved dual tracking floatable mounted booster and multiple mirror concentrating collector systems that provide uniform concentrated sunlight over photovoltaic cells.

Further objects and advantages of the invention will become apparent as the following description proceeds and the features of novelty which characterize this invention will be pointed out with particularity in the claims annexed to and forming a part of this specification.

BRIEF DESCRIPTION OF THE DRAWING

The present invention may be more readily described by reference to the accompanying drawing, in which:

FIG. 6 is a perspective view of a booster mirror collector panel which can be substituted for the multiple mirror collector shown in FIG. 1 illustrating the panel in a substantially vertical position;

FIG. 7 is a cross-sectional view of FIG. 6 taken along the line 7—7;

FIG. 8 is a cross-sectional view of FIG. 7 taken along the line 8—8;

FIG. 9 is a partial exploded perspective view of a modification of the coolant system shown in FIGS. 6 and 7 showing passageways for the coolant formed in the panel material;

DESCRIPTION OF THE PREFERRED EMBODIMENT

Figure 1:
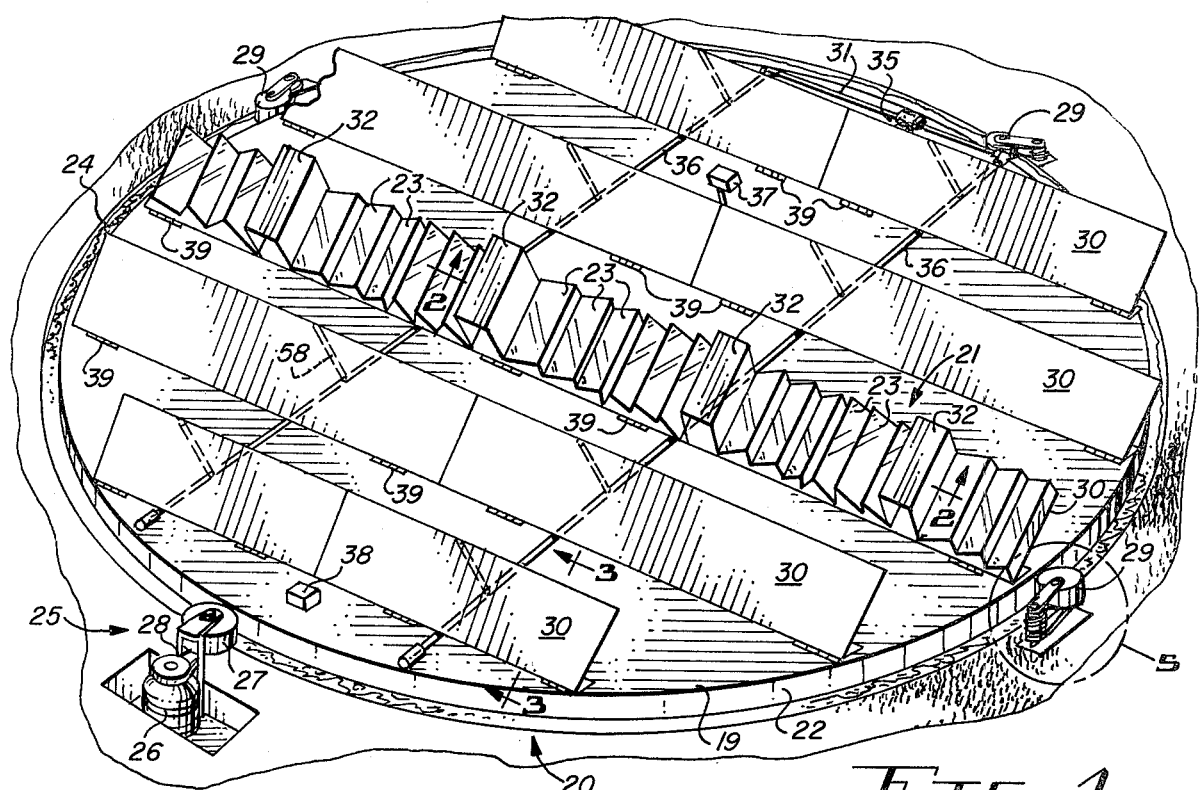
FIG. 1 is a perspective view of an azimuth tracking floating platform array of altitude tracking multiple mirror solar energy collectors.

Referring more particularly to the drawing by characters of reference, FIGS. 1–13 disclose a solar energy collection and conversion apparatus or system 20 utilizing an array 21 of reflectors supported on a rotating or arcuately movable floating platform 22.

Figure 2:
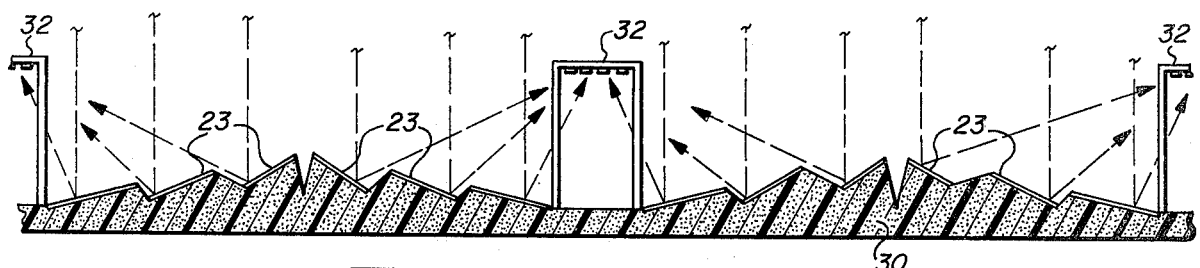
FIG. 2 is a cross-sectional view of FIG. 1 taken along the line 2—2.

The array 21 comprises a multiplicity of mirror type reflectors 23 either formed as a part of a unitary structure mounted on the platform, as shown more clearly in FIG. 2, or mounted in a frame to be pivotally moved on the platform to follow the sun.

The floating platform 22 may be constructed and placed on a shallow pool of water such as a contained pool 24 or it can be placed on any body of water regardless of its size. A tracking and platform moving mechanism 25 shown in FIGS. 1 and 3 comprising a suitable motor 26 and drive roller 27 connected to motor 26 through a pulley mechanism 28 is utilized to track the sun and move the platform azimuthally each day.

As noted from FIG. 1, the platform is driven by a drive roller 27 connected to motor 26 and held in the middle of the pool by a plurality of spring biased driven rollers 29. The drive roller rotates the platform by frictionally engaging the peripheral edge of the platform and rotating it upon rotation of the drive roller.

Platform 22 may be formed of any suitable floatable material 28 such as, for example, the expanded polystyrene, wax impregnated material described in U.S. Pat. No. 4,079,170 and disclosed for this use in co-pending U.S. patent application, Ser. No. 836,356, now U.S. Pat. No. 4,148,301, disclosed above. The platform can also be made of modular interconnecting panels constructed of closed cell foam such as stryofoam laminated with fiberglass and resin. The foam panels could be reinforced with plastic, wooden or metal struts prior to being laminated with fiberglass and resin. For colder regions subject to freezing the bottom of the platform could be constructed so to be smooth in order that tracking could continue using ice as the supporting media when the reservoir was frozen. Alternately freezing could be prevented by adding waste heat to the pool or using an antifreeze type chemical additive.

The array 21 of reflectors shown in FIG. 1 each comprise a focussing flat plate collector panel 30 hingedly mounted with hinges 39 on platform 22 and focused by a moving mechanism 31 for collecting solar energy and together with the platform moving mechanism 25 provides the dual function of collecting the sun's energy.

One of the basic problems inherent in maximizing the efficiency of any solar collector is that of tracking the sun. This is particularly true of focusing collectors. Flat plate collectors are placed in a fixed position either horizontally or inclined toward the equator. Even though the efficiency of the flat plate collector could be increased significantly, heretofore the costs of providing such a tracking mechanism using known land supported mechanism has been prohibitive.

This problem of tracking the sun is greatly reduced when the collectors are mounted on a floating platform as disclosed herein. Only a small amount of force is needed whether the raft or platform is floated in a confined pool or on open water.

FIGS. 1 and 2 illustrate a flat multiple mirror azimuth-altitude tracking solar panel 30, a plurality of which are parallelly arranged on the floating platform 22. Each panel is formed to provide fixed sloping surfaces or reflectors 23 positioned to receive and reflect the sun's rays upward onto one or more collector panels 32. It should be noted that these surfaces or reflectors 23 are of different widths to accomplish their purpose. The reflectors can be of back or front surfaced glass mirrors or other materials such as chemically treated or film covered aluminum. In this type of tracking, the panels are kept pointed in the direction of the sun by the combined function of the moving mechanisms 24 and 31.

The multiple mirror, azimuth-altitude tracking collector would have the advantage of concentrating a greater amount of sunlight per unit of collector panel than heretofore possible because the collector panels can be made wider than heretofore feasible without increasing its profile. The design of this type of collector panel is also a function of the height of the collector panel 32 above the base of the mirrors and the width of the mirrors. FIGS. 1 and 2 depict a design in which three reflectors are mounted on each side of an associated collector panel and these reflectors remain in a fixed relation to the collector panel even when the panels are pivotally moved by the moving mechanism 31 to follow the sun. The surface covered with reflective mirrors using this design is approximately 82 percent. The panel 30 as indicated in FIG. 2, for example, can be made of wax saturated expanded polystyrene or any other suitable lightweight material such as wood, plastic or lightweight metal. For large construction runs, molds can be used to produce the shaped panels with flat mirror strips laid on the identified slots and suitably fastened thereto in the manner shown in FIG. 2.

The disclosed concept offers virtually unlimited options in construction as far as concentration ratios are concerned. The width can easily be increased providing the receiving collector 22 is elevated proportionately. Thus, much wider collectors with a low profile will be possible than using prior art approaches. It should be relatively easy to reach up to 500° F. by adjusting this ratio provided care is taken in the design and construction of the collector panels. Construction costs should be much less per unit area using the flat mirrors of this novel concept versus the curved reflector required in prior art parabolic or cylindrical collectors. Although the multiple mirror collector is illustrated in this patent due to its inherent low cost, other sections of more conventional continuous cylindrical parabolic collectors could be substituted provided they were oriented in the same direction. This unique arrangement is made possible through the ease in azimuth tracking made possible by the floating solar collector. The size of the collectors could be adjusted to meet the heating and cooling requirements of a home or subdivision. A larger unit or units could furnish thermal power to operate a conventional power plant.

The temperature of the resulting liquid contained in the collection tube would depend on the total size of mirrors as compared with the amount of liquid flowing in the tube.

Figure 4:
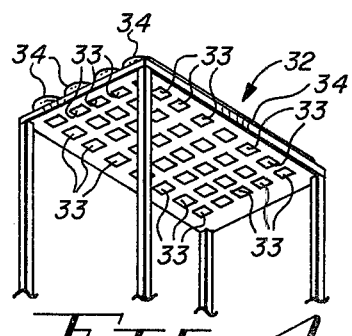
FIG. 4 is an enlarged perspective view of one of the photovoltaic mounted collector panels shown in FIGS. 1 and 3.
Figure 5:
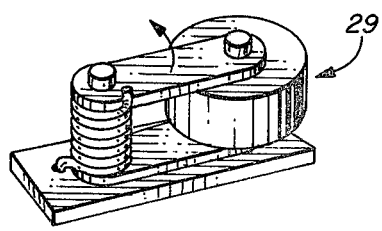
FIG. 5 is an enlarged perspective view of the spring biased platform guiding roller shown in the circled portion of FIG. 1.

As shown in FIGS. 1, 2, 4 and 6, the collector panels 32 may be faced with photovoltaic cells 33 diagrammatically shown which are utilized for direct conversion of solar rays to electrical energy by concentrating sunlight on the cells. As shown in FIGS. 4, 7 and 8, a liquid can pass through cooling tubes 34 mounted adjacent the surface on which the photovoltaic cells are mounted at a rate high enough as needed to keep the temperatures of the cells below a specified amount. Energy contained in liquid passing through the tubes can be put to useful work. Thus, both electrical and thermal energy can be generated at the same time.

Floating collectors of this type can be set up on roofs of large buildings, on the ground near apartment complexes or in subdivisions. The reservoir on which the collector floats could be used as a storage of hot water heating in the winter or cold water for cooling in the summer. The system would be connected to the building, apartments or individual homes through insulated pipelines. In the developed countries, any excess electrical energy could be sold back to the electrical utility in exchange for drawing on the electrical system when the sun was not shining. In areas where no other source of electricity is available, other types of electrical storage such as batteries or the storage of liquid pumped to an elevated position for later gravitational release would have to be used to provide a continuous power source.

The floating collector has considerable potential when used in conjunction with pumping for irrigation. The collector could be floated on a reservoir needed to even out water production at the same time eliminated evaporation. The system should be very appealing to the irrigator, due to its simplicity, particularly if photovoltaic cells are used. The floating collector can be used on a large scale on existing reservoirs in arid lands, in tideland or marshy areas.

It should be noted that the moving mechanism 31 for the panels 32 may pivotally move these panels in any suitable manner. As shown in FIG. 1, a motor 35 rotates a pair of spaced screw means 36 which pivotally moves simultaneously all of the parallelly arranged panels depending upon a signal received from the altitude light sensing mechanism 37. This light sensing means which is known in the art energizes the reversible motor 35 of the moving mechanism 31 in either direction depending on the sun's rays to keep the reflective surfaces 23 of the panels perpendicular to the sun's rays. One sensor is needed per motor to sense the proper altitude array. In a similar way, the azimuth light sensing mechanism 38 activates the motor 26 in either azimuthal direction depending on the sun's rays through the use of the sensor to keep the reflective surfaces of the collectors perpendicular to the rays of the sun. Only one sensor and motor is needed to maintain the proper azimuthal orientation of the floating platform.

As disclosed in the discussion of the array 21 of reflectors in FIG. 1, each of the panels 30 are hingedly attached at one edge to the top surface 19 of the floating platform 22 so that suitable screws 36 attached thereto may pivotally move the panels 30 about their hinges 39 by means of the moving mechanism 31 to keep the reflective surfaces in alignment with the sun as heretofore described.

Figure 3:
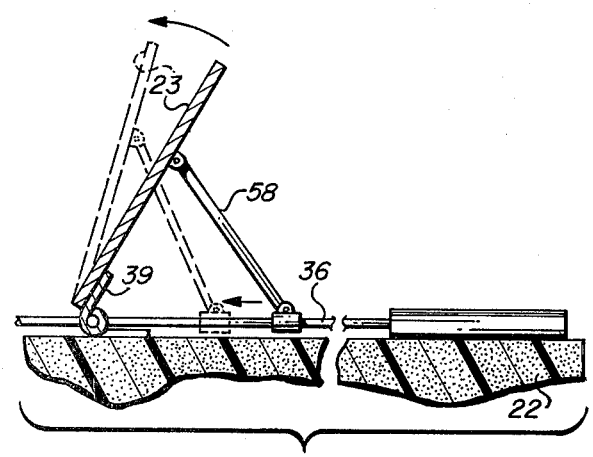
FIG. 3 is a partial perspective view of the floating platform shown in FIG. 1 taken along the line 3—3.

FIG. 3 illustrates one way of pivotally moving the panels wherein the panels are shown merely as a flat surface rather than a molded configuration, as shown in FIGS. 2 and 6. The booster array panel arrangement of FIG. 6 may be substituted for the multi-mirror array 21 of reflectors shown in FIG. 1.

The collector array shown in FIG. 6 comprises a plurality of booster mirrors or reflective surfaces 23' which are supported on a saw tooth like support which positions the reflective surfaces 23' one on each side of a solar collector panel which may contain a plurality of photovoltaic cells 33.

Each reflective surface on either side of the collector panel may be positioned at approximately a sixty degree angle with the surface of the collector panels. A sixty degree angle with a width of mirror equal in length to the width of the collector panels on which the photovoltaic cells 33 are mounted will approximately double the amount of energy available by reflecting the sunlight downward to the absorbant part of the collector panel.

FIGS. 7 and 8 also illustrate one way of arranging the cooling pipes below the surface supporting the photovoltaic cells although other configurations may be used as long as the cells are properly cooled.

FIG. 9 illustrates an alternative arrangement for cooling the photovoltaic cells by forming passageways 40 in the base of the supporting platform 41. The ends of the passageways 40 of each platform 41 may be provided with pipe sections 42 for use in interconnecting with other similar platforms of like collector panels 32.

Figure 10:
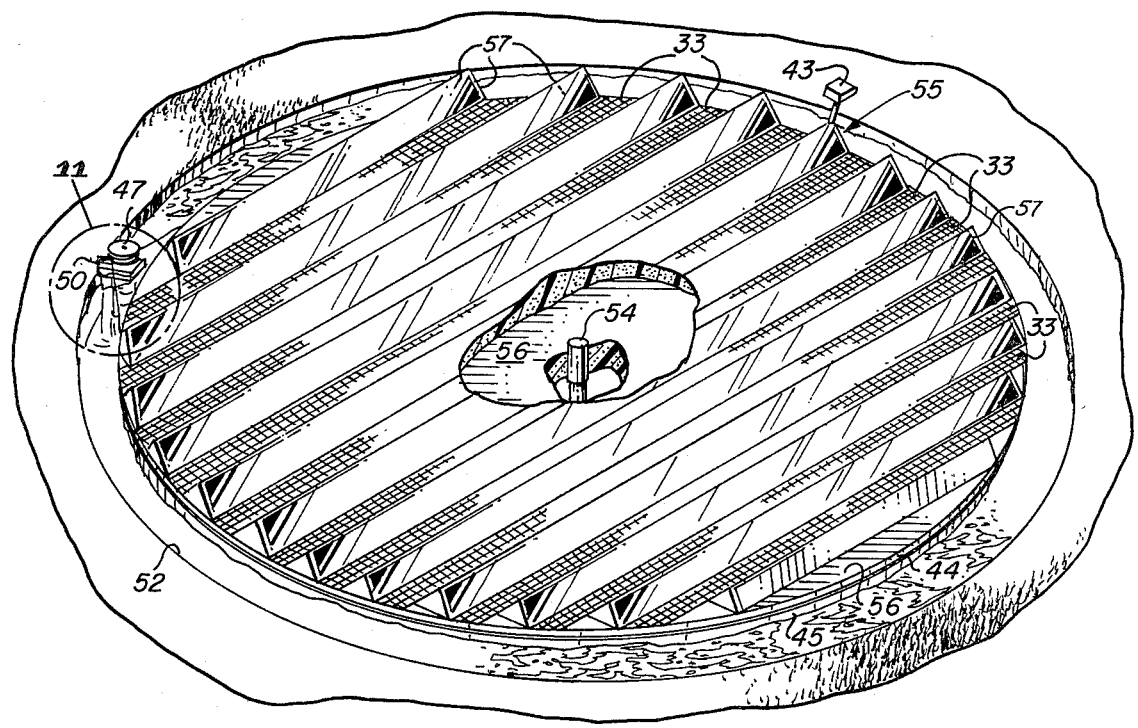
FIG. 10 is a perspective view of an azimuth or single track booster mirror collector system on a modification of the floating platform shown in FIG. 1 which is movable about a pivot point by a windlass driven by a floating motor.
Figure 11:
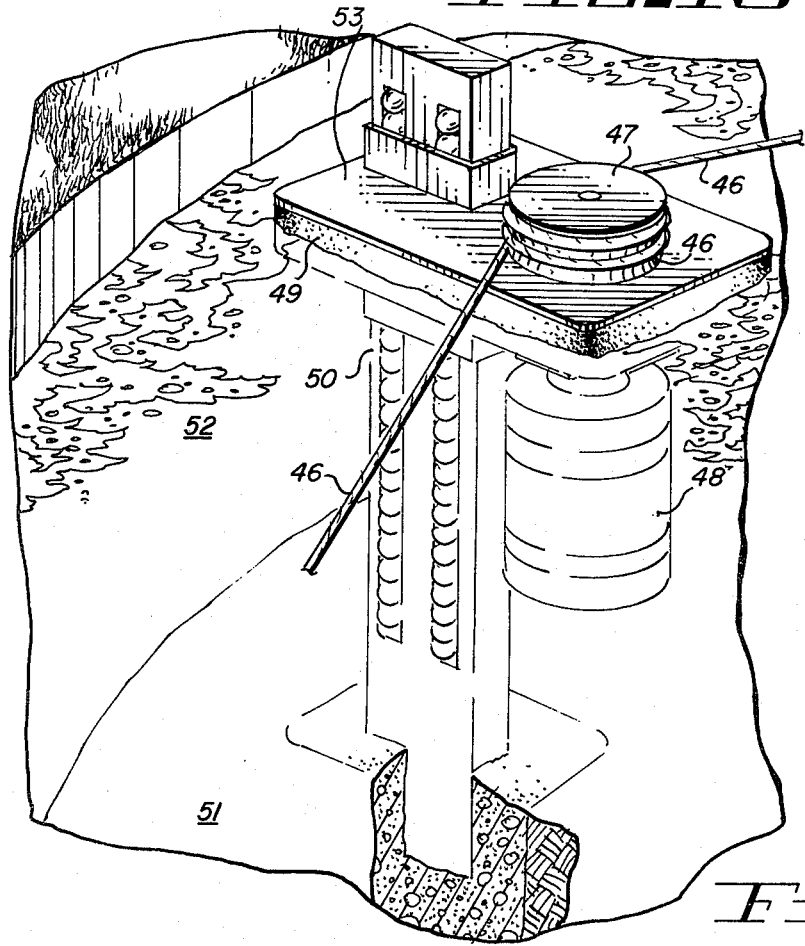
FIG. 11 is an enlarged perspective view of the motor driving means shown in FIG. 10.

FIGS. 10 and 11 further disclose a circular floating platform 44 which is provided with a groove 45 around its periphery forming a track for receiving the driving belts 46 of a windlass 47. This windlass and associated spring tensioned rope or belts 46 are driven by a suitable electric motor 48 which may be of a submergeable type. As shown, the motor can be supported on a float 49 and held to a hollow, slotted ball bearing filled support 50 supported on the bottom 51 of a pool, pond or lake 52.

As noted from FIG. 11, motor 48 is supported by float 49 and a plate 53 which surrounds support 50 and is arranged to be guided therealong by the ball bearings extending through the slot extending longitudinally of support 50. As noted, the support is rectangular in cross-section so that any lateral torque on the float 49, plate 53 and motor housing will not rotate them relative to support 50.

Thus, it should be noted that as the water level of the pond, pool or lake rises and falls causing the floating platform 44 to rise and fall, the motor will correspondingly move up and down along support 50 thereby keeping the windlass 47 aligned with the peripheral edge of the floating platform 44 as shown in FIG. 11. If the water level is kept constant, the azimuth drive motor 48 can be fixed. It should be noted that this same type of floating motor could be utilized with the chain driven method of tracking disclosed in Matlock and Cluff patent application, Ser. No. 839,644, filed Oct. 5, 1977 and now abandoned.

FIG. 10 illustrates that the floating platform is rotatively mounted around a pivot point or post 54 which is suitably anchored on the bottom of the pond, pool or lake and which may be grooved along a part of its length for providing a passageway for wires or pipes needed for the solar concentrating reflective array 55 mounted on its exposed top surface 56.

FIG. 10 illustrates the use of a booster mirror system on a single or azimuth tracking array instead of the dual tracking array shown in FIGS. 1 and 6. In this case, the collector can be continuous, covering the entire surface of the platform. Tracking is accomplished by means of light sensor 43 which activates motor 47 in the azimuth direction needed to keep the axis of the collector pointed at the sun.

The reflective array 55 shown in FIG. 10 comprises a plurality of booster mirrors or reflective surfaces 57 which are supported on a saw tooth like configuration which positions the reflective surfaces 57 one on each side of a solar collector panel which may contain a plurality of the photovoltaic cells 33.

Each reflective surface may be positioned at approximately a sixty degree angle with the surface of the collector panel. The width of the mirrors of the reflectors are substantially equal in length to the width of the collector panels 32 on which the photovoltaic cells 33 are mounted.

Figure 12:
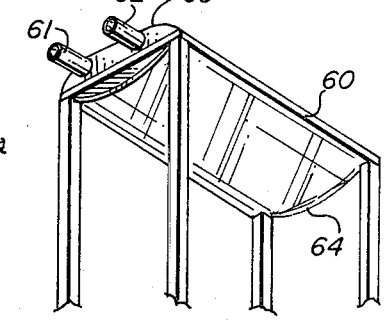
FIG. 12 is a perspective view illustrating a modification of the collector panel shown in FIG. 4.
Figure 13:
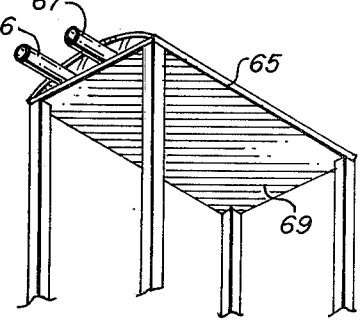
FIG. 13 is a perspective view illustrating a further modification of the collector panels shown in FIGS. 4 and 12.

FIGS. 12 and 13 illustrate further modifications of the collector panels 32 on which photovoltaic cells 33 are mounted.

FIG. 12 illustrates a black panel 60 for collection of high temperature hot water and steam having at least a pair of inlet and outlet conductors 61 and 62, respectively, mounted to traverse the back side of the panel. These conductors may be covered with suitable insulation 63. The solar absorbing black side of the panel is covered with a single or double layer of glass or similar transparent material 64 for insulation purposes.

FIG. 13 illustrates a further modification of a collector panel 65 for the collection of low temperature hot water. A pair of inlet outlet conductors 66 and 67, respectively, are mounted to extend across the back of the solar collector and they are covered with a single or double layer of glass 68. In this low temperature application, solar energy can be collected from both sides of the collector with both sides of the solar collector having a black or absorbing surface 69. The side that faces the reflectors, i.e., surface 69 could alternatively be a photovoltaic panel.

With regard to the arrays of reflectors disclosed wherein water is used for cooling the photovoltaic cells which are directly heated by the solar rays, the incoming relatively cool liquid may be pumped through piping (not shown) into and out of post 54 to one side of the reflector array across the center of the platform to the other side of the array as disclosed in the copening application, Ser. No. 836,356, now U.S. Pat. No. 4,148,301. A suitable pumping system (not shown) is utilized for pumping the liquid through these pipes whether the source of water is the pool on which the platform is supported or any other source.

Although but a few embodiments of the invention have been illustrated and described, it will be apparent to those skilled in the art that various changes and modifications may be made therein without departing from the spirit of the invention or from the scope of the appended claims.

What is claimed is:

1. A heat exchange means comprising:
   a floating platform,
   means for positioning said platform for arcuate movement through a given path when floating on a liquid,
   a plurality of arrays of juxtapositioned parallelly arranged reflectors each mounted on the top of said platform,
   at least one solar ray collector panel mounted on each array to extend longitudinally of said reflectors and disposed with its axis in the focal zone of said reflectors,
   each array of said reflectors comprising at least one pair of reflector surfaces with one of each pair being angularly arranged on different sides of a given collector panel for directing the solar rays toward the collector panel, and
   platform actuating means for moving said platform about an arcuate path for tracking the sun in an azimuthal mode.

2. The heat exchange means set forth in claim 1 wherein:
   said platform actuating means comprising a motor means for driving the peripheral edge of said platform for rotation thereof.

3. The heat exchange means set forth in claim 1 wherein:
   said platform actuating motor means comprises a motor driven windlass engaging the peripheral edge of said platform.

4. The heat exchange means set forth in claim 1 wherein:
   said array of reflectors comprises pairs of similar reflectors one angularly arranged on each side of a collector panel for directing the solar rays toward the collector panels in a direction away from the sun.

5. The heat exchange means set forth in claim 1 wherein:
   each array of said reflectors comprises at least one pair of similar reflective surfaces angularly positioned one on each side of a collector panel for directing the solar rays toward the collector panel in a direction toward the sun.

6. The heat exchange means set forth in claim 5 wherein:
   said reflective surfaces are of different widths according to their distance from the associated panel in order to provide complete illumination of the associated panel.

7. The heat exchange means set forth in claim 1 wherein:
   the collector panels are each provided with a plurality of photovoltaic cells.

8. A heat exchange means comprising:
   a floating platform,
   means for positioning said platform for arcuate movement through a given path when floating on a liquid,
   a plurality of arrays of juxtapositioned reflectors each mounted on hinged supports on the top of said platform,
   each array of reflectors is spaced with relationship to the others to reduce shadowing when the sun is at low angle and comprising more than one reflective surface for reflecting solar rays to a given solar ray collector,
   at least one solar ray collector panel mounted on each array of reflectors to extend longitudinally of said reflectors and disposed with its axis in the focal zone of said reflectors,
   each array of reflectors comprising at least one reflective surface angularly positioned on each side of a collector panel for directing the solar rays toward the collector panel,
   each collector panel being provided with a plurality of liquid cooled photovoltaic cells
   means for pivotally mounting each of said array of reflectors on the top surface of said platform,
   motor means for simultaneously pivotally moving each of said arrays of reflectors,
   means for sensing the position of the sun for energizing said motor means and for moving the arrays to orient and maintain said reflectors approximately in a plane containing the sun's center, whereby the reflection of the sun's rays are concentrated by said reflectors on the collection panels, and
   platform actuating means for moving said platform about an arcuate path,
   said platform actuating means comprising a motor means for engaging the peripheral edge of said platform for rotation thereof using an azimuthal mode for tracking the sun.

9. The heat exchange means set forth in claim 8 in further combination with:

a post mounted adjacent said platform, and means for attaching said motor means to said post for guided movement therealong upon fluctuation of the level of the water supporting said platform.

10. The heat exchange means set forth in claim 9 wherein:

said post is rectangular in cross-section and provided with a slot extending longitudinal thereof, and ball bearings mounted in said slot, said means for attaching said motor means to said post comprises a plate surrounding said post and guided therealong by said post and the ball bearings in said slot, said plate preventing rotation of said motor means relative to said post.

11. The heat exchange means set forth in claim 8 wherein:

said platform is provided with a fiberglass or other smooth coating around its water engaging surfaces to prevent freezing to the water on which it is floating.

12. The heat exchange means set forth in claim 8 wherein:

said array of reflectors comprises pairs of similar reflectors one angularly arranged on each side of a collector panel for directing the solar rays toward the collector panels in a direction away from the sun.

13. The heat exchange means set forth in claim 8 wherein:

said array of reflectors comprise more than one reflective surface angularly positioned on each side of a collector panel for directing the solar rays toward the collector panel in a direction back toward the sun.

14. The heat exchange means set forth in claim 8 wherein:

said reflective surfaces are of different widths according to their distance from the associated panel in order to provide complete illumination of the associated panel.

15. The heat exchange means set forth in claim 1 wherein:

each pair of reflective surfaces associated with a given panel are positioned at a different angular position with reference to the top of said platform than any other pair of reflective surface on said platform associated with said panel.

* * * * *